M. C. MILLER.
KNIT FABRIC.
APPLICATION FILED AUG. 11, 1913.

1,210,344.

Patented Dec. 26, 1916.
10 SHEETS—SHEET 1.

WITNESSES:
K. D. McPhail
E. A. Cheney

INVENTOR.
Max C. Miller
BY
Phillips Van Every & Fish
ATTORNEY.

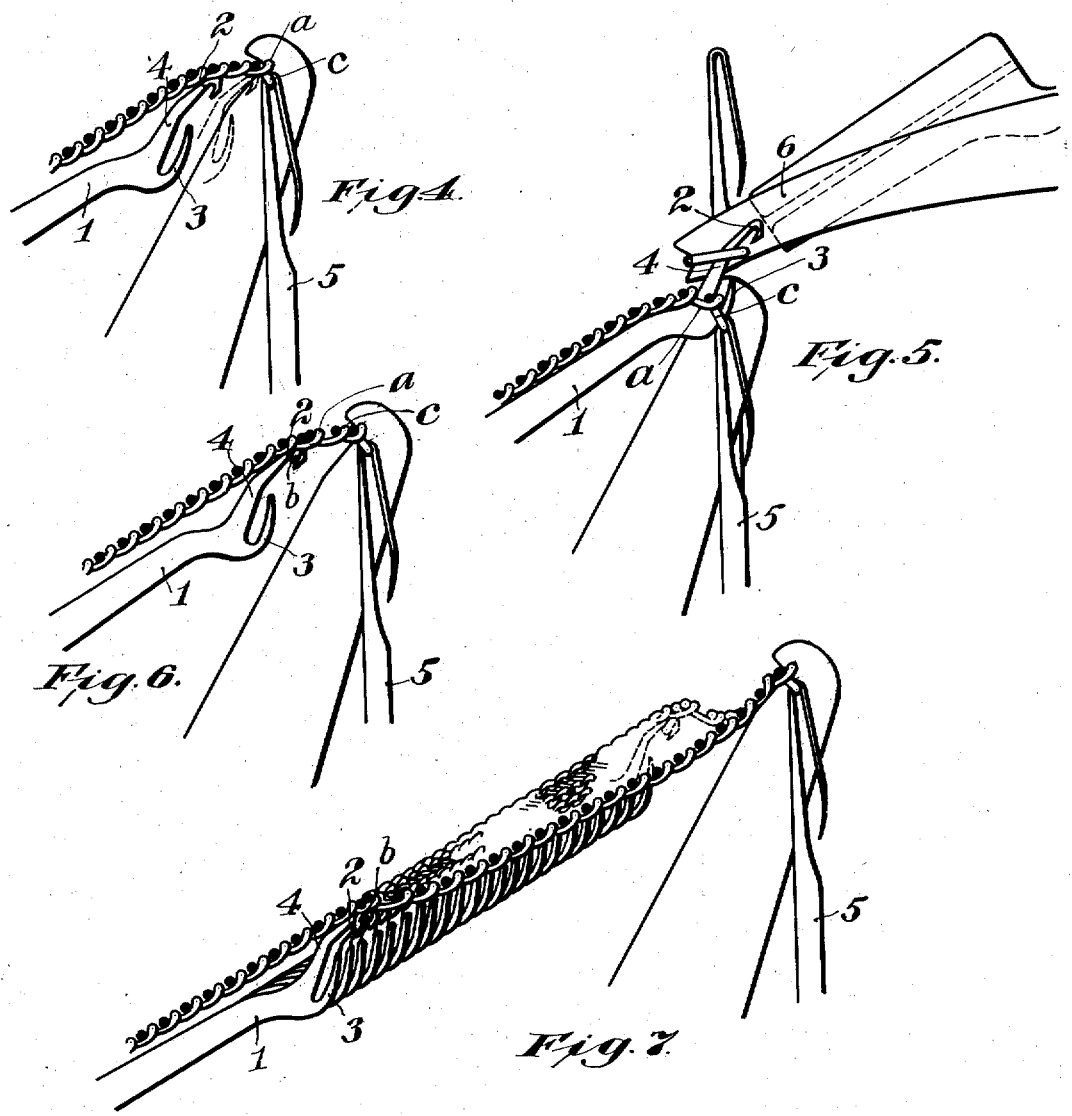

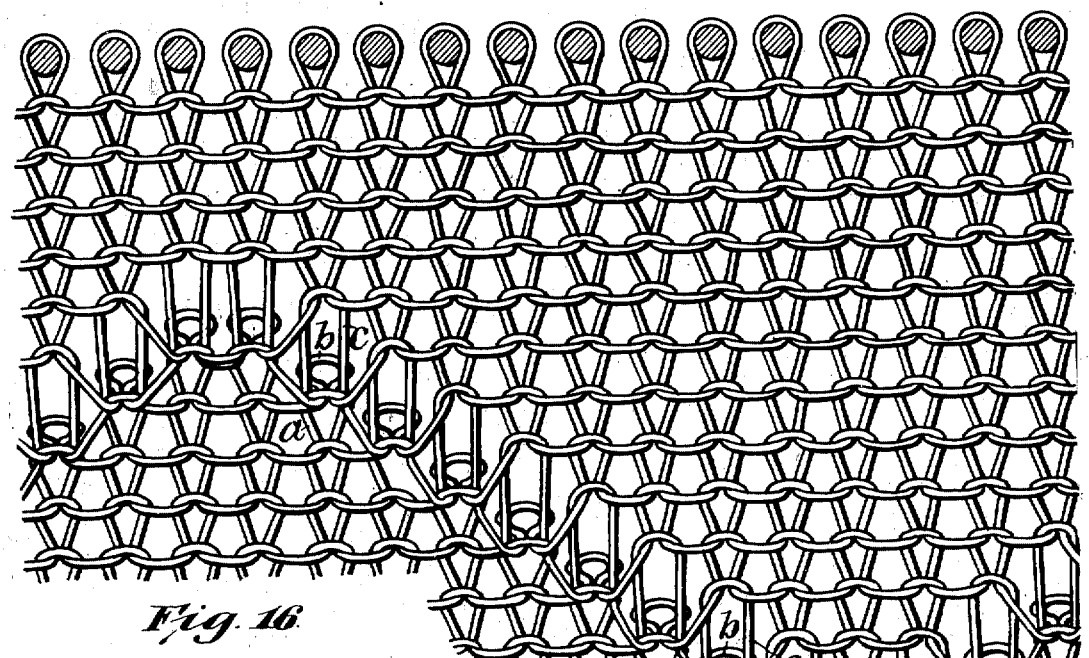
Fig. 16.
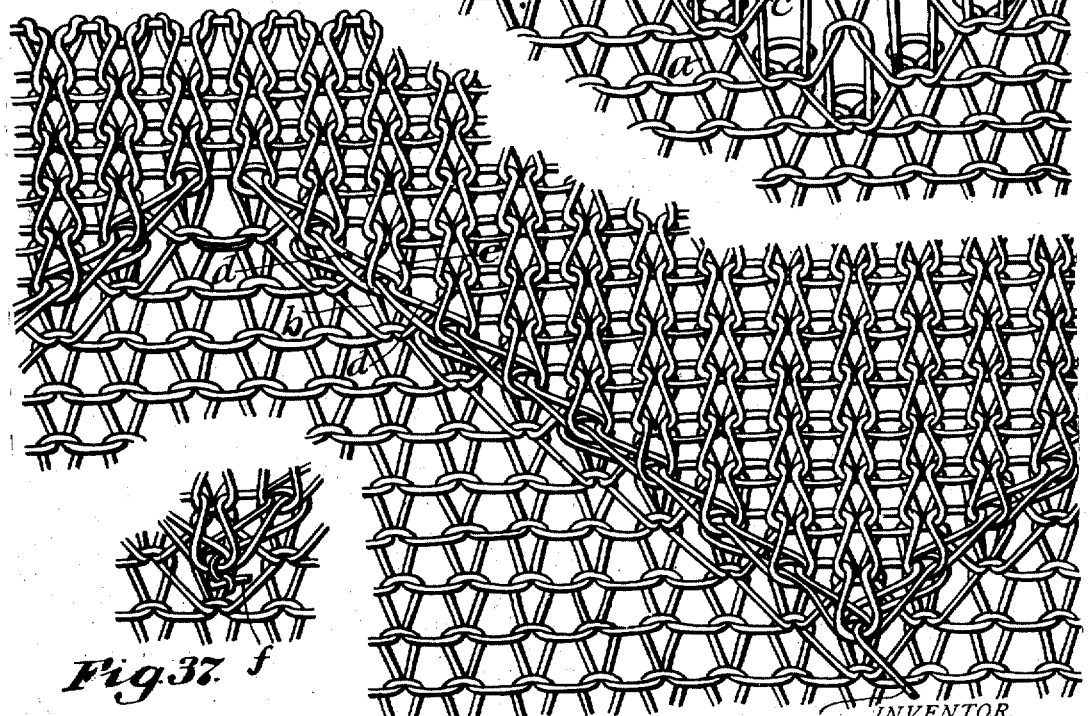
Fig. 37.
Fig. 36.

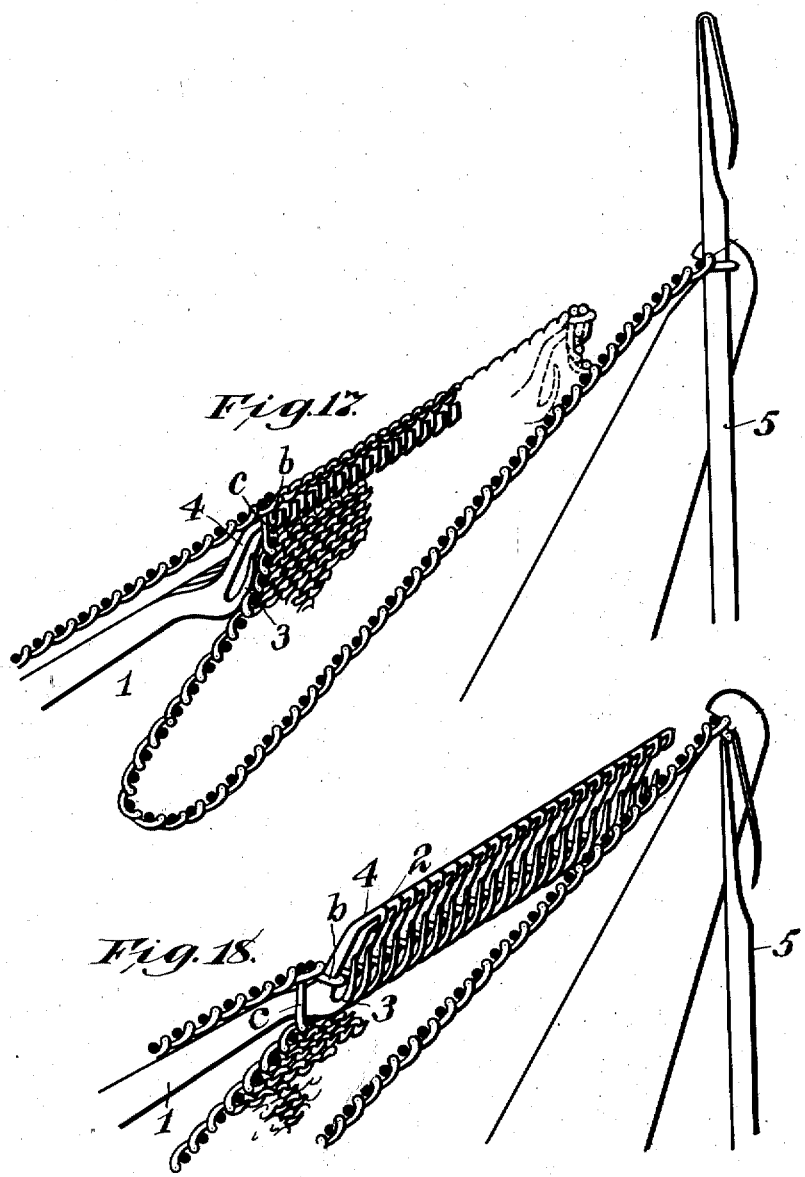

M. C. MILLER.
KNIT FABRIC.
APPLICATION FILED AUG. 11, 1913.
1,210,344.
Patented Dec. 26, 1916.
10 SHEETS—SHEET 7.
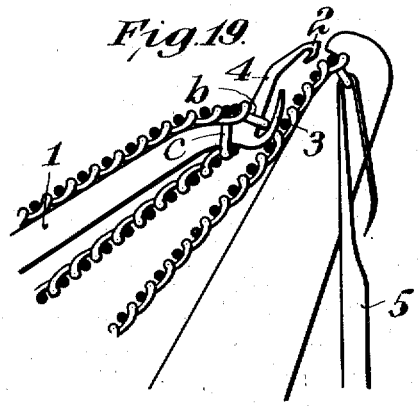
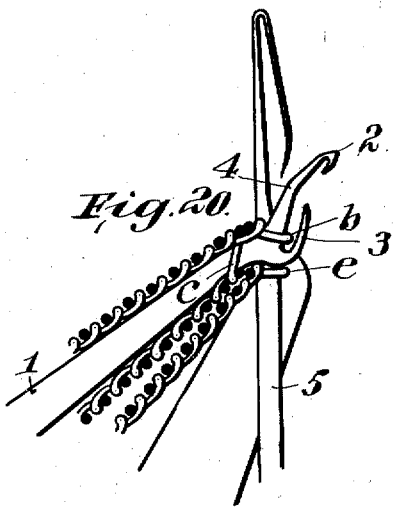
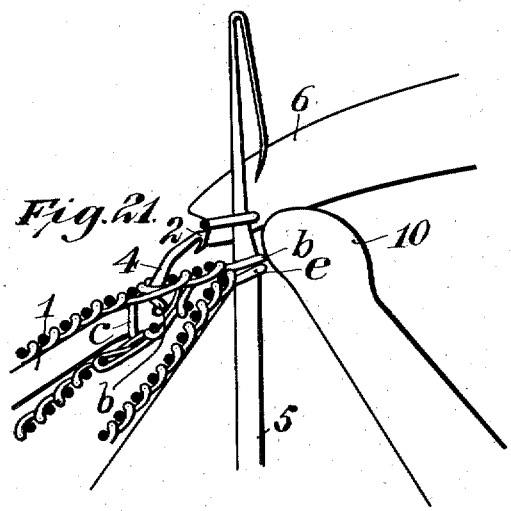
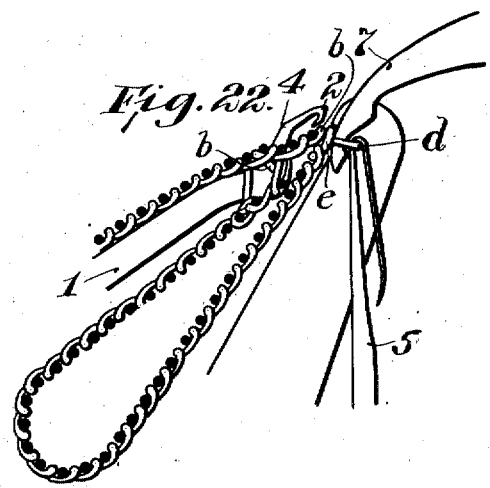
WITNESSES:
N. D. McPhail
E. A. Cheney
INVENTOR.
Max C. Miller
BY
Phillips Van Orden & Fish
ATTORNEY.

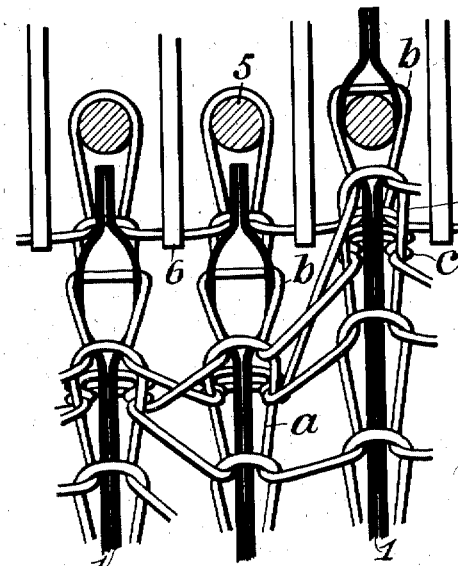
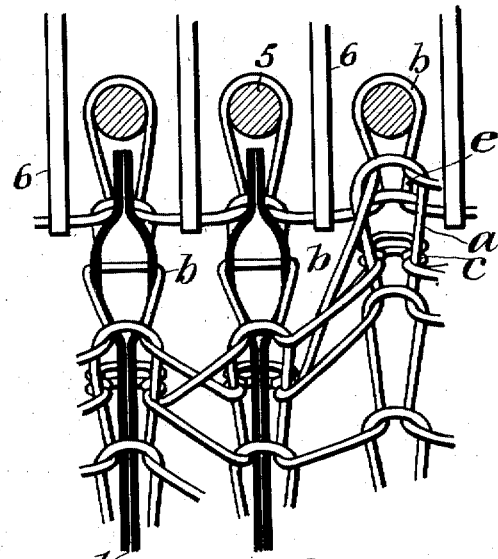
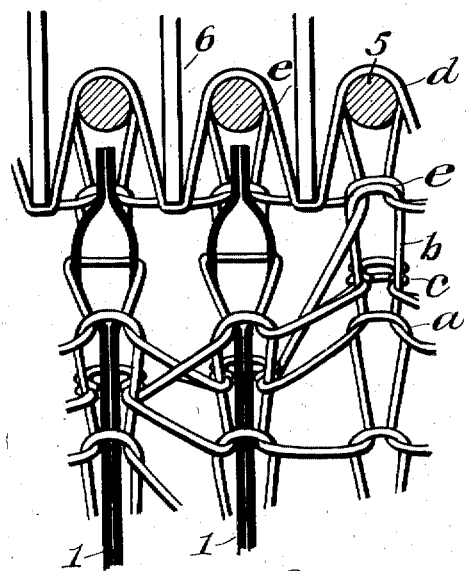
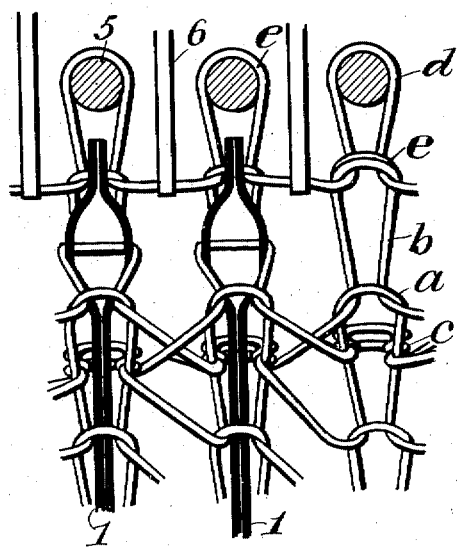

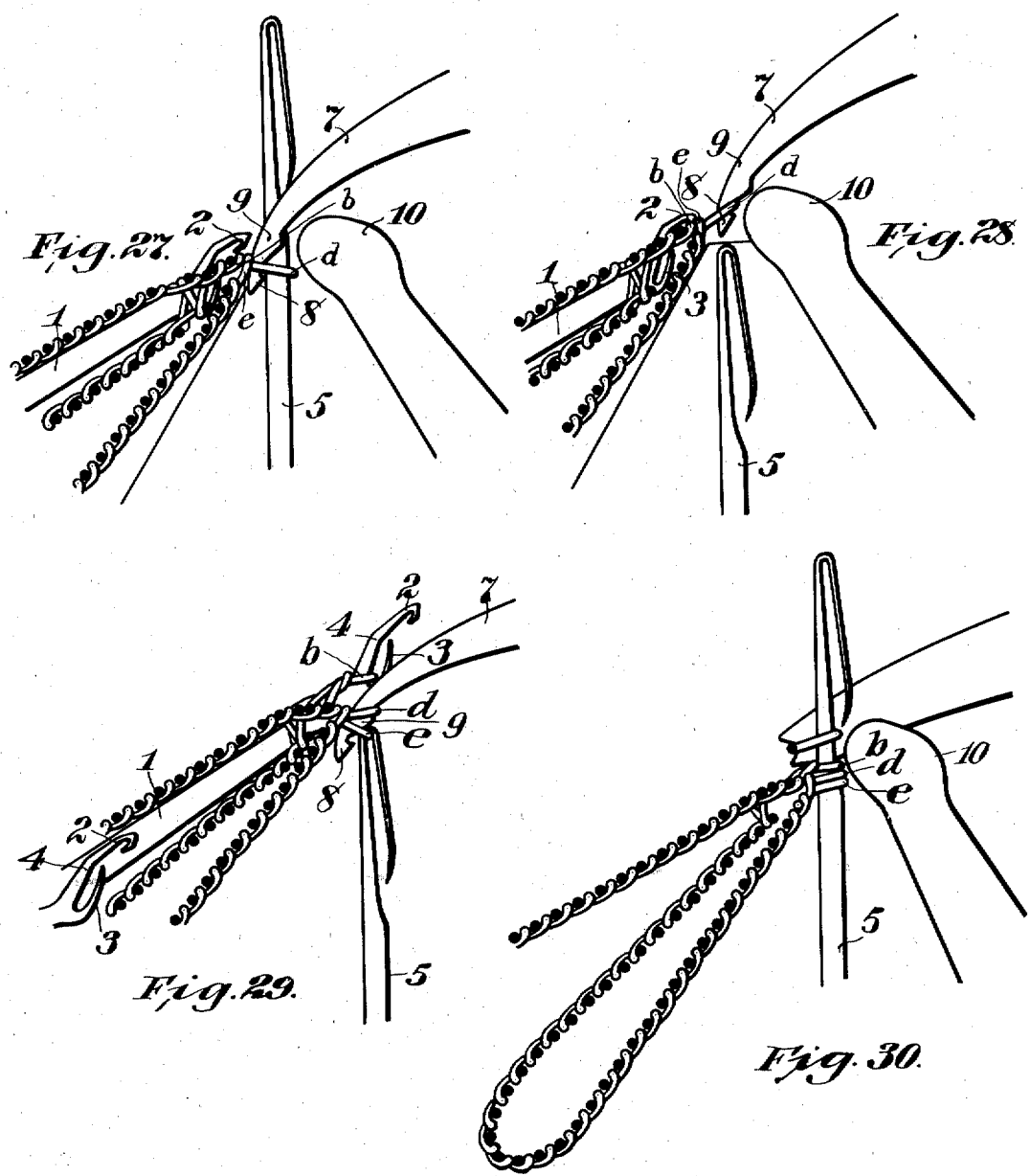

UNITED STATES PATENT OFFICE.

MAX C. MILLER, OF PROVIDENCE, RHODE ISLAND, ASSIGNOR TO JENCKES KNITTING MACHINE COMPANY, OF PAWTUCKET, RHODE ISLAND, A CORPORATION OF RHODE ISLAND.

KNIT FABRIC.

1,210,344.  Specification of Letters Patent.  Patented Dec. 26, 1916.

Application filed August 11, 1913. Serial No. 784,234.

*To all whom it may concern:*

Be it known that I, MAX C. MILLER, a subject of the Emperor of Germany, residing at Providence, in the county of Providence and State of Rhode Island, have invented certain new and useful Improvements in Knit Fabrics; and I do hereby declare the following to be a full, clear, and exact description of the invention, such as will enable others skilled in the art to which it appertains to make and use the same.

The invention relates to a welted knit fabric and method of making the same.

The primary object of the invention is to provide a novel and improved welted fabric in which the turned edge of the welt is integrally united with the body fabric, and in which the welt may be knit and secured to the body fabric at the completion of the stocking or other fabric in which the welt is incorporated.

It is a further object of the invention to provide a knit stocking having a closed toe and integrally united welt which may be completed by a continuous knitting operation, thereby avoiding the necessity for subsequent looping or sewing operations to close the toe or secure the edge of the welt to the body fabric of the leg.

To these ends the invention consists in the methods and the fabrics produced thereby hereinafter described and referred to in the claims.

The features of the invention will be readily understood from an inspection of the accompanying drawings and the following detailed description of the fabric and devices illustrated, and of the method of manipulating the devices to produce the fabric.

Figure 2:
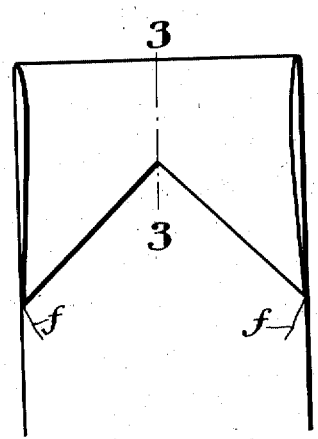
Figure 3:
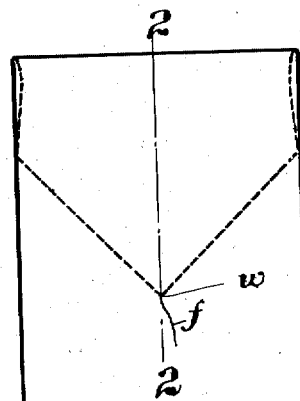
Figure 1:
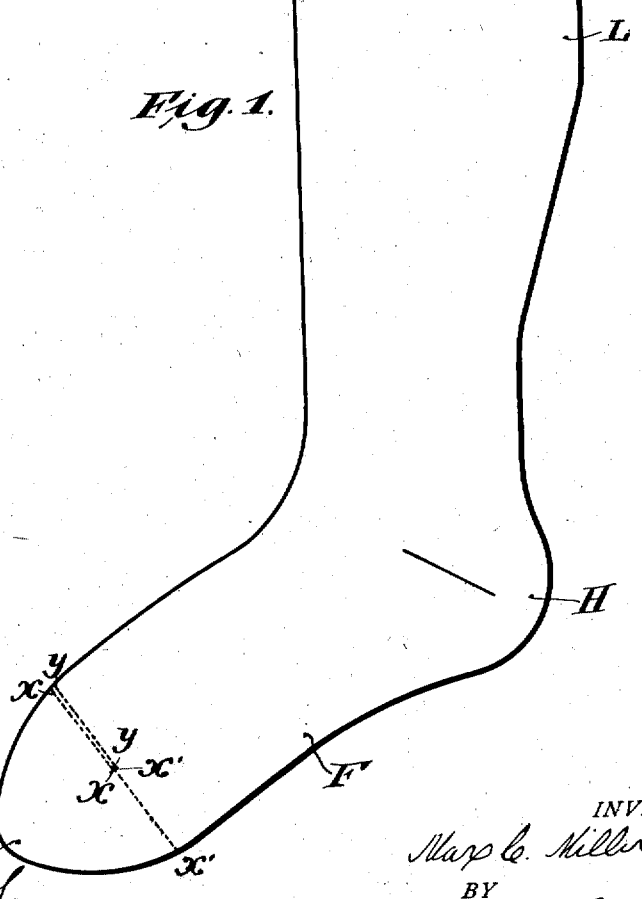

In the drawings, Figure 1 is a view showing a stocking embodying all the features of the invention in their preferred forms; Fig. 2 is a sectional view through the inturned welt at the top of the stocking leg, taken on the line 2—2, Fig. 1; Fig. 3 is a vertical sectional view on line 3—3, Fig. 2; Figs. 4 to 16 are a series of diagrammatic views showing the method of forming a series of welt attaching loops about the leg of a stocking on a spring-needle, two-bank straight knitting machine; Figs. 17 to 35 are a series of diagrammatic views showing the method of forming the juncture between the edge of the welt fabric and the body fabric on the same machine; and Figs. 36 and 37 are views showing the juncture between the welt and body fabrics.

Two-bank straight knitting machines are well adapted for and have heretofore been used for knitting closed toe stockings either with or without fashioned feet or fashioned legs, and the welt and stocking of the present invention may be knit with commercial advantage upon machines of this type. In knitting a stocking embodying all the features of the invention in their preferred form upon a two-bank straight knitting machine, the toe, foot, heel and leg may be knit in the usual manner, as on the machine of the Nelson Patent No. 585,589. A setting-up course is formed on both banks of needles, the loops indicated at $x$—$x$, Fig. 1, being formed on the front bank, and the loops indicated at $y$—$y$ being formed on the back bank. The front bank is then operated to knit the toe pouch or pocket T in the usual manner. When the toe is completed, the front bank holds the series of loops indicated at $x'$—$x'$ along one side of the fabric, while the loops $y$—$y$ along the other side of the fabric are still held by the back bank. The tubular fabric (either fashioned or unfashioned) forming the foot F is then knit on both banks. The heel H is then knit on a part of the needles at one end of each bank in the usual manner, after which the leg L is knit on the needles of both banks, needles at the heel ends of the banks being added in the usual manner if a fashioned leg is to be knit.

In knitting the welted fabric of the present invention, when the point $w$ in the leg of the stocking or other fabric is reached, at which the juncture between the welt and body of the fabric is to be subsequently formed, a series of welt attaching loops are formed which extend about the fabric, and which are to be interlocked with loops formed at the edge of the welt after the welt fabric has been knit. In the preferred fabric these welt attaching loops are formed in each needle wale, and the loops in adjacent wales are formed in succeeding courses, although this arrangement of loops is not essential.

In knitting the stocking or other fabric on a two-bank straight machine, the welt attaching loops may be formed and held and subsequently transferred to the needle, by a series of loop retainers corresponding in number to the number of welt attaching loops which are to be formed. In knitting the preferred fabric, the machine will be provided with a loop retainer corresponding to each needle in the machine. The loop retainers 1 illustrated in the drawings are formed of two contacting strips of sheet metal, and are provided at their ends with loop retaining hooks 2 and with loop guiding fingers 3. The strips forming the loop retainers are bent outward back of the hooks 3 to form eyes 4 for the passage of the needles, and the hook ends of the strips may spring apart to allow the needle to pass laterally between them. These devices are mounted so that they may be moved in the manner to be described, and may be actuated by any suitable mechanism.

Figure 8:
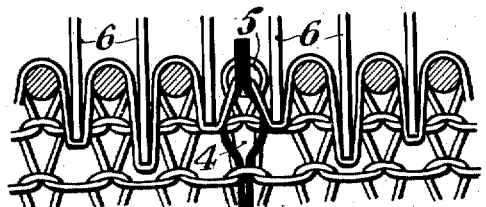
Figure 9:
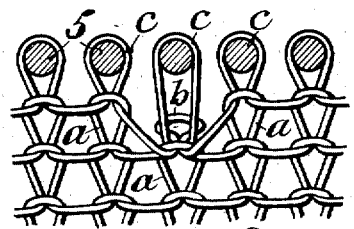
Figure 10:
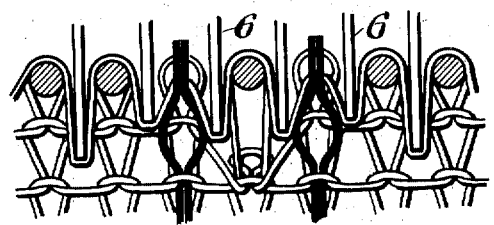
Figure 11:
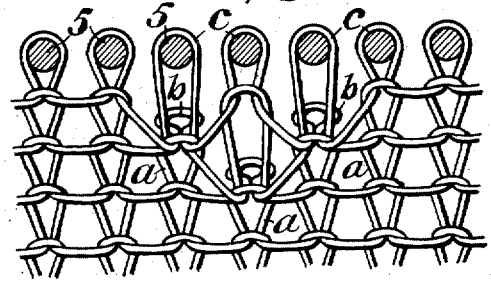
Figure 12:
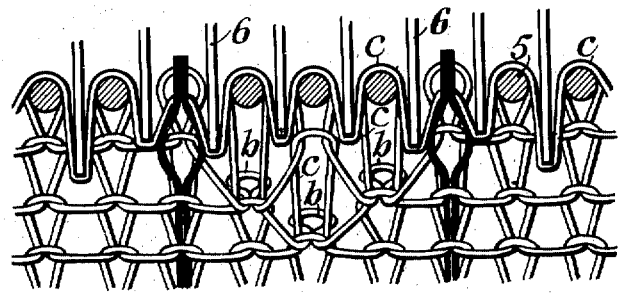
Figure 13:
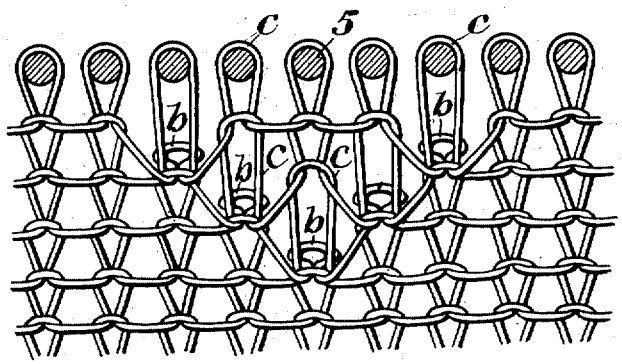
Figure 14:
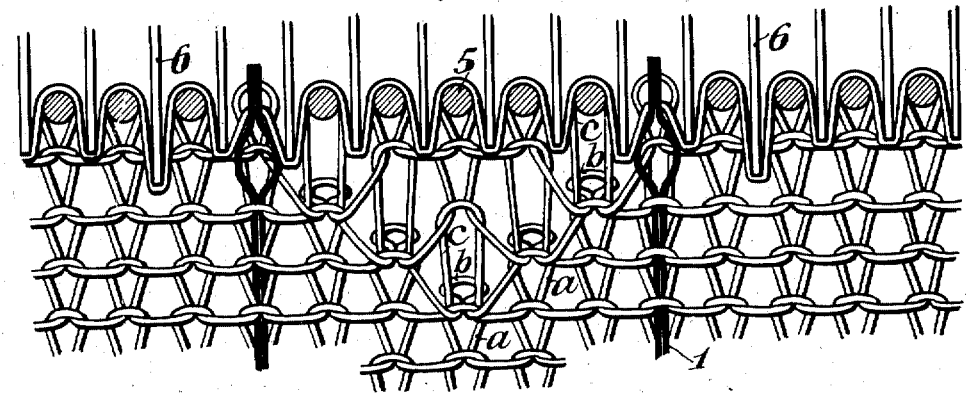
Figure 15:
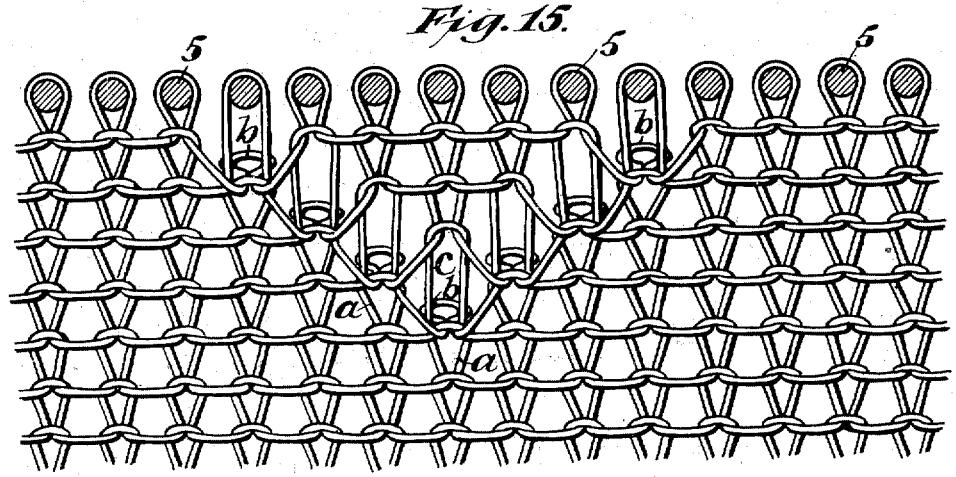

When the series of welt attaching loops are to be formed, the loop retainers 1 are moved forward from their inactive retracted position into the position indicated in full lines in Fig. 4, the loop retainers corresponding to each bank of needles lying within the needles and outside of the fabric as indicated. Assuming that the needles 5 of the front bank have been drawn down to draw their loops, as indicated in Fig. 4, the center loop retainer 1 will be advanced into the position indicated in dotted lines, and will then be thrust upward through a loop $a$ back of the long loop $c$ last drawn by the center needle of the front bank, as indicated in Fig. 5. All the needles in the front bank with the exception of the center needle 5 will then be raised in the usual manner to receive the yarn, and the yarn will be laid about the needles by the usual yarn guide and the reciprocating sinkers 6. The yarn will also be laid by the sinkers about the loop retaining hook 1, which corresponds at this time to the center needle 5, certain of the sinkers being operated to measure off yarn to form the long loops referred to later, as indicated in Figs. 5 and 8. The needles will then be drawn down to draw the yarn through the loops and cast off the loops in the usual manner, the loop retainer 1 at the same time being drawn down through the loop $a$ to draw a welt attaching loop $b$ through the loop $a$ to the outside of the fabric (Fig. 6). The arrangement of the loops in the fabric at this stage is indicated in Fig. 9, there being a certain amount of slack yarn in the loops $c-c$ on opposite sides of the center needle, so that these loops become long loops, as indicated more clearly in Fig. 11. A welt attaching loop is formed in a similar manner in knitting upon the back bank of needles. After the needles of the front bank have been drawn down as described, the two loop retainers on opposite sides of the center retainer are advanced and thrust through the loops $a$ back of the long loops $c-c$ which were drawn by the corresponding needle 5. The yarn is then laid about the needles and these two loop retainers by the sinkers, certain of the sinkers being operated to form long loops, as indicated in Fig. 10. The needles are then drawn down to draw their loops and the loop retainers are drawn through the loops $a$ to draw the welt attaching loops $b$ through the loops $a$ and to the outside of the fabric. The arrangement of the loops and the fabric at this stage is indicated in Fig. 11. The same operation is repeated in knitting upon the back bank. In knitting the succeeding course upon each bank, the next two loop retaining hooks are operated to receive and draw welt attaching loops, as indicated in Fig. 12. The arrangement of the loops after the knitting of the third course and the drawing of the loop retaining loops $b$, is indicated in Fig. 13. During the knitting of the succeeding course, the next two loop retainers are operated as indicated in Fig. 14, and the welt attaching loops $b$ are formed as indicated in Fig. 15. The operation described continues until all the loop retainers have been actuated to form the welt attaching loops, the arrangement of the loops after the forming of all the welt attaching loops being indicated in Fig. 16. As here indicated, the loops will extend in angularly arranged series from the center needle wales of the front and back banks to the end needle wales of each bank. At this stage of the knitting the loop retainers will each hold in its hook a welt attaching loop which has been drawn through a loop in the fabric directly back of one of the long loops $c$. The needles are then operated in the usual manner to knit the fabric which is to form the welt. During the knitting of this fabric the loop retainers 1 will be moved back so that the fabric may hang down between the needles and the series of loop retainers, as indicated in Figs. 7 and 17.

After the length of fabric required to form the welt has been knit, the loop retainers are moved forward, while the main and welt fabrics are held by suitable takeups, and the hooks 2 and guides 3 will pass through the long loops $c$, as indicated in Figs. 18 and 19, the guides 3 serving to guide the long loops over the welt retaining loops $b$. This will bring the welt securing loops $b$ to the inside of the fabric, and will also bring them into register with the eyes 4 of the loop retainers 1. During the continued knitting of the fabric, end or selvage loops at the edge of the welt are drawn through each of the welt attaching loops, and these selvage loops are knit into the fabric, preferably being knit into the adjacent needle wale, thus integrally uniting the turned-in edge of the welt with the body fabric. In the preferred fabric, each selvage loop drawn through a welt attaching loop is knit in or secured to the adjacent needle wale by the selvage loop which is drawn through the welt attaching loop of that needle wale.

In knitting the fabric in the manner illustrated, a selvage loop is drawn through a welt attaching loop during the knitting of each course, and is transferred to the next adjacent needle which during the knitting of the next course draws a selvage loop through the former selvage loop and through the welt attaching loop of its wale. The edge of the welt is thus integrally secured to the fabric by proper manipulation of the loop retainers, the needles, and coöperating transfer fingers or hooks 7. These fingers may be formed of two thin sheet metal plates similar to the plates forming the loop retainers, and are provided with loop engaging hooks 8 and with eyes 9 back of the hooks through which the needles may pass.

The mode of operation in finishing and securing the welt is as follows: After the last course of continuous tubular knitting is reached, the loop retainers at either end of the front bank are moved forward over the ends of the end needles bringing the eyes 4 and the welt attaching loops b into position over the upper ends of the needles. The needles then rise, the end needles passing up through the eyes of the loop retainers and through the loops b carried by the retainers, as indicated in Figs. 20 and 23. The end loop retainers then withdraw through the loops b and c into their full retracted position, leaving the loop b on the needle, as indicated in Fig. 24. The yarn guide then lays the yarn across the front bank of needles, and the yarn is looped about the needles by the sinkers in the usual manner, as indicated in Figs. 21 and 25. The needles are then drawn down to draw the new loops through the loops on the needles, a selvage loop d being drawn by each of the end needles of the front bank through the welt attaching loop b and through the loop e of the previous course, as indicated in Fig. 26. The end loop retainers and needles of the back bank are then operated in a similar manner, the yarn guide acting to lay the yarn across the needles in the usual manner. From this point on in the knitting of the fabric the yarn guide which has operated to deliver the yarn to both the front and back needles is reciprocated back and forth to deliver yarn to the needles of the back bank only, while an additional yarn guide is employed to deliver yarn to the needles of the front bank, the two yarn guides being reciprocated back and forth alternately, and the needles of each bank being operated to knit two courses in succession. After the selvage loops d have been drawn by the end needles of the front and back banks, these loops are transferred to the adjacent needles toward the centers of the banks, and the end needles are thrown out of action. The loops d are thus transferred by the transfer fingers 7, which are arranged at opposite ends of each bank of needles and travel step by step toward the center needles during the knitting of successive courses. While the needles of the front bank are in their lower position, as indicated in Fig. 22, after having drawn the loops d, the two transfer fingers 7 for the front bank are moved forward over the needles, and their hooks 7 thrust through the loops d, as indicated in Fig. 22. The end needles are then raised, passing up through the loops d and through the eyes of the transfer fingers, as indicated in Fig. 27. These needles are then drawn down, their beards being closed by the beard pressers 10, so that the loops d are cast off the needles and transferred to the hooks 8 of the transfer fingers, as indicated in Fig. 28. The transfer fingers are then raised slightly to clear the upper end of the needle bed, and are moved laterally into position over the adjacent needles toward the center of the bank, and are then moved downward to carry their hooks into the loops held by these needles, which are now the end needles of the active series, since the needles from which the loops d were taken remain out of action during the continuation of the knitting.

Figure 35:
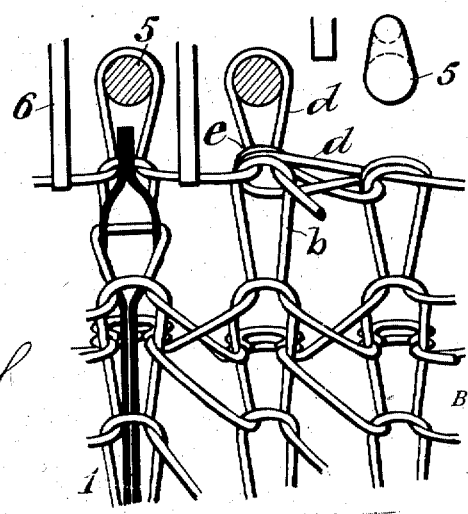
Figure 31:
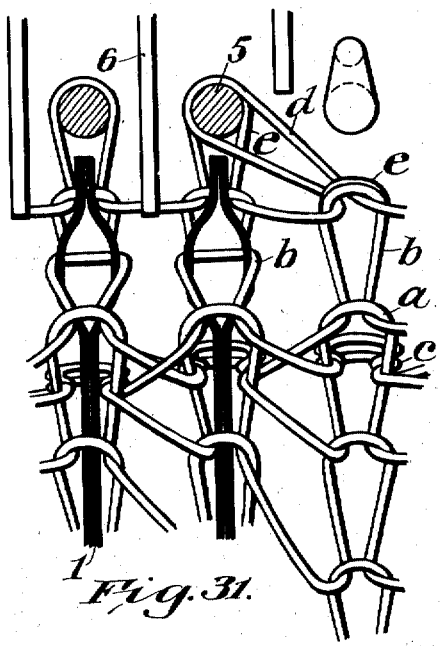
Figure 32:
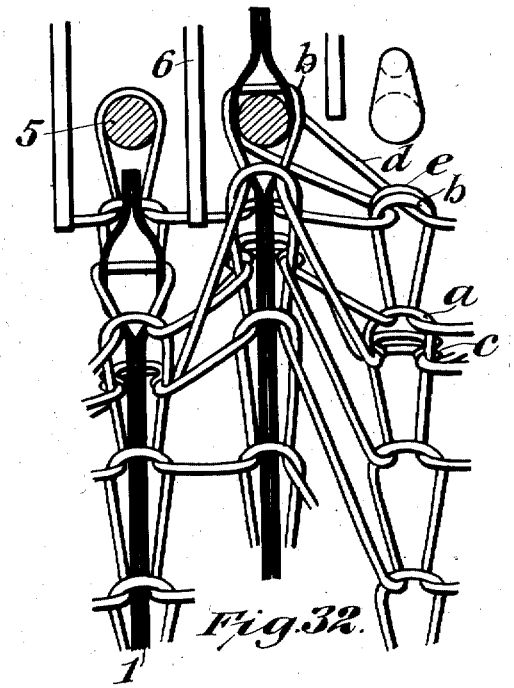
Figure 33:
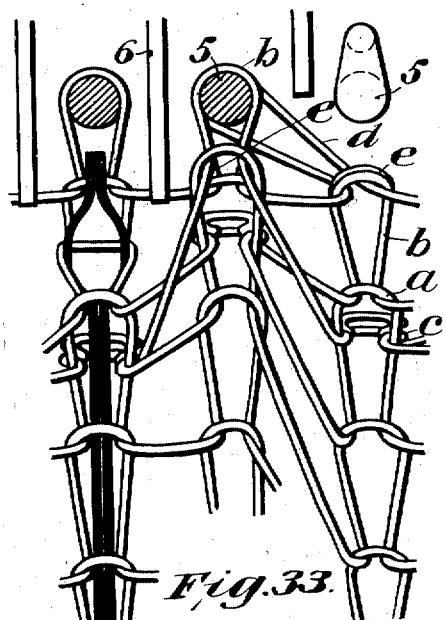
Figure 34:
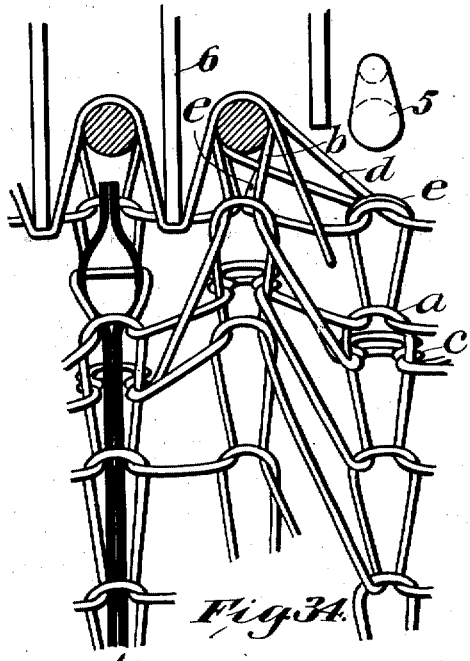

Fig. 31 indicates the position of the loop d, the transfer fingers being omitted. The loop retainers 1 corresponding to these end needles now move forward over the upper ends of the needles to bring their welt attaching loops b into position over the needles, as indicated in Fig. 29. In coming into this position, the strips of the loop retainers may pass between or outside of the strips of the transfer fingers. As shown, they pass between these strips. The front bank of needles is then raised, the end needles passing up through the selvage loops d and through the welt attaching loops b, as indicated in Figs. 30 and 32. The loop retainers and transfer fingers are then withdrawn, the plates of the fingers springing outward to allow them to pass on opposite sides of the needle. The loops b and d carried by the transfer fingers and loop retainers are thus transferred to the end needles, as indicated in Figs. 30, 33 and 34. The yarn is then laid along the needles and looped about the needles by the sinkers, as indicated in Figs. 30 and 34, after which the needles are drawn down to draw the new loops of yarn. In drawing these loops of yarn, the end needles draw selvage loops through the welt attaching loops b of their own wales, through the selvage loop d of the adjacent wale, and through the loop e formed by the needle in knitting the preceding course (Fig. 35). These selvage loops are transferred to the next adjacent needles toward the center of the series, and are knit into the fabric in knitting the next succeeding course, in the manner already described with reference to the first formed selvage loops. The same action takes place on the rear bank, and the knitting on the front and rear banks continues, the series of active needles in each bank being reduced by two in successive courses until the center needle is reached. In transferring the selvage loops *d* from the needles on opposite sides of the center needle to this needle, the selvage loop on one side and the welt attaching loop are transferred to the needle in the manner already described. The needle is then drawn down, its beard remaining open so that the loops are not cast off, and the transfer finger 7 carries the selvage loop *d* on the opposite side of the needle into position above the needle. The needle is then raised through this selvage loop, and the transfer finger withdrawn, leaving the selvage loop on the needle. The yarn is then laid across the needle, and the needle drawn down to draw a loop through two selvage loops, through the welt attaching loop, and through the loop drawn by the needle in knitting the previous course. This finishes the fabric, leaving two free ends drawn through the last four loops described, which are indicated at *f* in Fig. 36. These ends may be tied or fastened in any suitable manner, as indicated in Fig. 37.

This application relates to the same general subject matter as is disclosed in applicant's copending application Ser. No. 784,235, filed Aug. 11, 1913.

Having explained the nature and object of the invention, and specifically described one form thereof, what is claimed is:—

1. A stocking comprising an integrally knit closed toe and a turned welt, the end or selvage loops of which are integrally united with the body of the leg.

2. A stocking comprising an integrally knit closed toe and a welt integrally united with the body of the leg and having its selvage loops interlocked with each other.

3. A stocking comprising an integrally knit closed toe and a welt, the selvage loops of which are interlocked with loops in the leg fabric and with each other.

4. A knit fabric having a turned welt integrally connected with the body web by loops which pass through loops in the body wales and are united to adjacent wales.

5. A knit fabric having a turned welt integrally united with the body web by an angular juncture.

6. A knit fabric comprising a body welt having angularly arranged series of welt attaching loops and a welt web, the end loops of which pass through the attaching loops and are secured to the fabric.

7. A knit fabric having a turned welt connected to the body web by welt attaching loops in each needle wale, the loops in adjacent wales being in succeeding courses.

8. A knit fabric comprising a body web having a welt attaching loop in one or more center wales and welt attaching loops in succeeding courses on opposite sides of the center wale and a progressively increasing number of wales from the center wale, and a welt having loops of its wales passed through a welt attaching loop and through a loop of an adjacent wale.

9. A knit fabric comprising a body web having a welt attaching loop in one or more center wales and welt attaching loops in succeeding courses on opposite sides of the center wale and a progressively increasing number of wales from the center wale, and a welt having loops interlocked with the attaching loops and with loops of adjacent wales.

10. The method of knitting a stocking which consists in knitting a closed toe, foot, heel and leg, forming a series of welt attaching loops in the body of the leg, knitting a welt web, and passing loops of the welt fabric through the welt attaching loops and securing the selvage loops of the welt fabric.

11. The method of knitting a stocking which consists in knitting a closed toe, foot, heel and leg, forming a series of welt attaching loops in the body of the leg, knitting a welt web, passing loops of the welt fabric through the welt attaching loops, and interlocking the selvage loops of the welt web.

12. The method of knitting a stocking which consists in knitting a closed toe, foot, heel and leg, forming a series of welt attaching loops in the body of the leg, knitting a welt web, passing the selvage loops of the welt web through the attached loops, and interlocking the selvage loops.

13. The method of knitting a welted fabric which consists in knitting a body web, forming a series of welt attaching loops, knitting a length of web beyond the loops, and uniting the selvage or end loops of the latter web with the loops.

14. The method of knitting a welted fabric which consists in knitting a body web, forming a series of welt attaching loops, knitting a length of welt beyond the loops, uniting the latter web with the loops, and interlocking the selvage and welt attaching loops.

15. The method of knitting a welted fabric which consists in knitting a body web and a welt web, discontinuing wales in successive courses of the welt web, and uniting the end loops of the discontinued wales with the body web.

16. The method of knitting a welted fabric which consists in knitting a body web, forming welt attaching loops in each needle wale, the loops in adjacent wales being formed in succeeding courses, knitting a welt web, discontinuing wales in successive courses of the welt web, passing the loops of the discontinued wales through welt attaching loops, and securing them in the fabric.

17. The method of knitting a welted fabric which consists in knitting a body web, forming welt attaching loops in each needle wale, the loops in adjacent wales being formed in succeeding courses, knitting a welt web, discontinuing wales in succeeding courses of the welt web, and passing the end loops of each discontinued wale through a welt attaching loop and through the end loop of another wale.

18. The method of forming securing loops in a knit fabric which consists in knitting courses upon a series of needles to form a web, passing loop retainers through loops in a course preceding that held by the needles, drawing loops for the loop retainers, and thereafter continuing the knitting upon the needles.

19. The method of knitting a welted fabric which consists in knitting a tubular web on two banks of needles, passing loop retainers through loops of the fabric, drawing loops by the loop retainers, continuing the knitting on the needles, transferring the loops from the loop retainers to the needles, drawing loops through the transferred loops and through the loops last drawn by the needles, and transferring these loops to adjacent needles.

MAX C. MILLER.

Witnesses:
N. D. McPhail,
E. A. Cheney.

It is hereby certified that in Letters Patent No. 1,210,344, granted December 26, 1916, upon the application of Max C. Miller, of Providence, Rhode Island, for an improvement in "Knit Fabrics," errors appear in the printed specification requiring correction as follows: Page 4, line 115, claim 13, before the word "loops" insert the words *welt attaching;* same page, line 121, claim 14, strike out the words "and welt attaching;" and that the said Letters Patent should be read with these corrections therein that the same may conform to the record of the case in the Patent Office.

Signed and sealed this 6th day of February, A. D., 1917.

[SEAL.]
R. F. WHITEHEAD,
*Acting Commissioner of Patents.*

Cl. 66—4.